United States Patent
Thoram et al.

(10) Patent No.: US 10,891,385 B2
(45) Date of Patent: Jan. 12, 2021

(54) ENCRYPTION AT REST FOR CLOUD-RESOURCED VIRTUAL MACHINES

(71) Applicant: Microsoft Technology Licensing, LLC, Redmond, WA (US)

(72) Inventors: Aravind N. Thoram, Sammamish, WA (US); Sudhakara Reddy Evuri, Bothell, WA (US); Mayank Mahajan, Bellevue, WA (US); Kahren Tevosyan, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 212 days.

(21) Appl. No.: 15/981,777

(22) Filed: May 16, 2018

(65) Prior Publication Data
US 2019/0354692 A1 Nov. 21, 2019

(51) Int. Cl.
*G06F 21/60* (2013.01)
*H04L 9/08* (2006.01)
*G06F 9/455* (2018.01)

(52) U.S. Cl.
CPC .......... *G06F 21/602* (2013.01); *H04L 9/0819* (2013.01); *H04L 9/0894* (2013.01); *G06F 9/45533* (2013.01)

(58) Field of Classification Search
CPC . G06F 21/602; G06F 9/45533; H04L 9/0819; H04L 9/0894
See application file for complete search history.

(56) References Cited

U.S. PATENT DOCUMENTS

| | | | | |
|---|---|---|---|---|
| 9,430,664 B2* | 8/2016 | Adam | ................ | H04L 63/0428 |
| 9,489,528 B2* | 11/2016 | Goel | ................... | G06F 21/6209 |
| 9,584,325 B1* | 2/2017 | Brandwine | ........... | H04L 9/3234 |
| 2009/0193267 A1* | 7/2009 | Chung | ................. | H04L 9/0891 |
| | | | | 713/193 |
| 2009/0210456 A1* | 8/2009 | Subramaniam | ......... | G06F 21/57 |
| 2009/0282266 A1* | 11/2009 | Fries | .................... | H04L 9/0833 |
| | | | | 713/193 |
| 2011/0113235 A1* | 5/2011 | Erickson | ................ | G06F 21/34 |
| | | | | 713/152 |

(Continued)

OTHER PUBLICATIONS

NPL Search (InnovationQ) (Year: 2020).*

*Primary Examiner* — Mahfuzur Rahman
*Assistant Examiner* — Richard W Cruz-Franqui
(74) *Attorney, Agent, or Firm* — Newport IP, LLC; Michael C. Johnson

(57) ABSTRACT

A compute resource provider system is shown having an encryption agent that obtains a cryptographic key for a virtual machine and sends the cryptographic key to a host agent. The host agent receives the cryptographic key from the encryption agent and stores the received cryptographic key to a user key vault. The host agent generates a key vault secret reference (KVSR) locator pointing to the cryptographic key stored in the user key vault, associates the KVSR with the virtual diskset, and sends a success message to the encryption agent. The encryption agent receives the success message from the host and, responsive thereto, encrypts the virtual diskset using the cryptographic key. Subsequently, another host agent uses the KVSR to obtain the cryptographic key from the key vault and boot the virtual machine with the encrypted virtual diskset.

20 Claims, 9 Drawing Sheets

(56) References Cited

U.S. PATENT DOCUMENTS

| | | | |
|---|---|---|---|
| 2011/0202916 A1* | 8/2011 | VoBa | G06F 9/45558 718/1 |
| 2011/0276806 A1* | 11/2011 | Casper | G06F 21/78 713/189 |
| 2014/0019753 A1* | 1/2014 | Lowry | H04L 9/083 713/155 |
| 2014/0281571 A1* | 9/2014 | Federspiel | G06F 21/6209 713/189 |
| 2015/0270956 A1* | 9/2015 | Basmov | H04L 9/0816 713/189 |
| 2015/0319160 A1* | 11/2015 | Ferguson | G06F 21/6281 726/10 |
| 2016/0028698 A1* | 1/2016 | Antipa | G06F 21/606 713/150 |
| 2016/0140343 A1* | 5/2016 | Novak | H04L 63/0428 713/2 |
| 2016/0210457 A1* | 7/2016 | Cleeton | G06F 21/60 |
| 2016/0308844 A1* | 10/2016 | Fielder | G06F 21/6209 |
| 2017/0243021 A1* | 8/2017 | Gupta | G06F 21/606 |
| 2019/0354692 A1* | 11/2019 | Thoram | H04L 9/0819 |

* cited by examiner

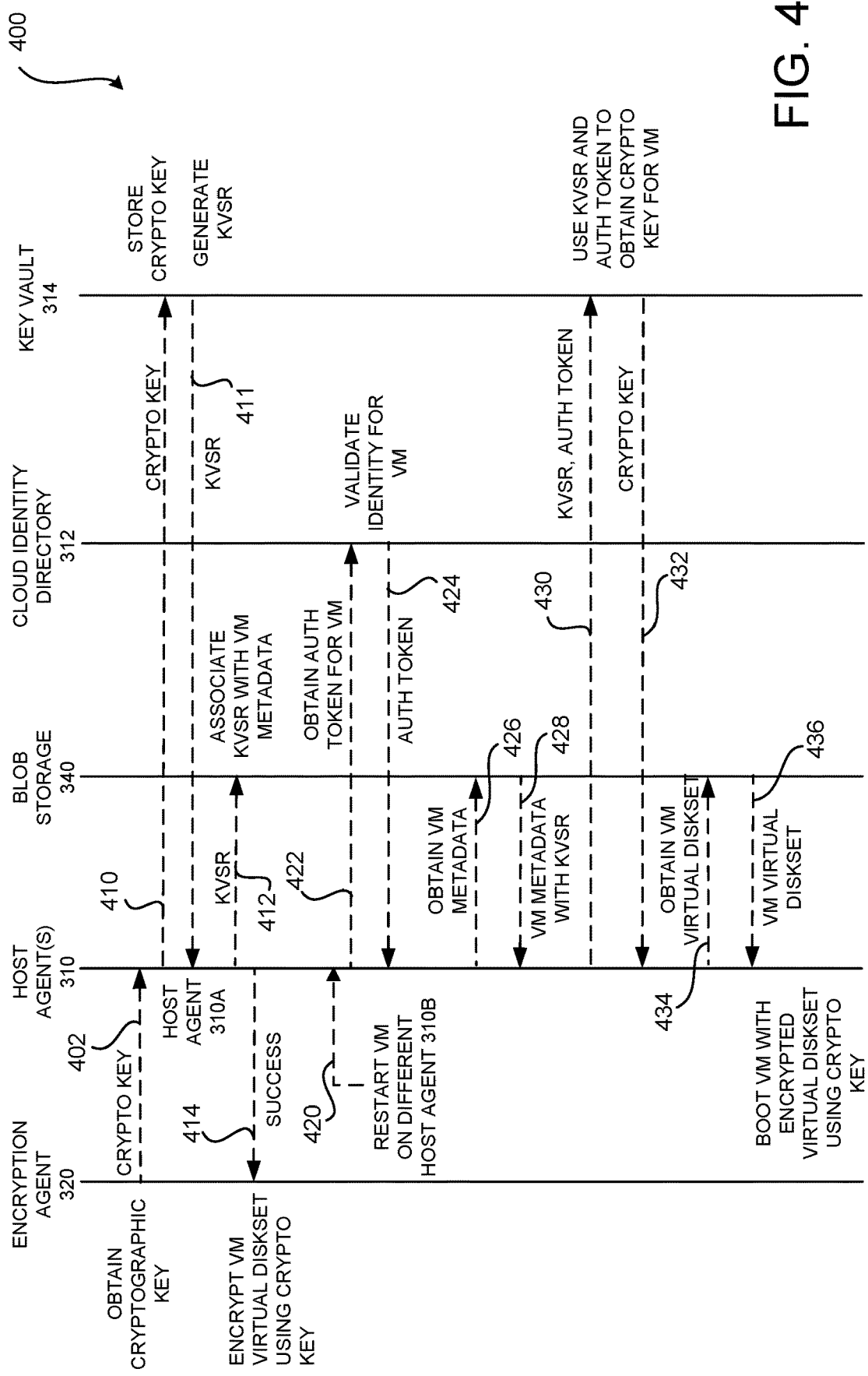

ENCRYPTION AT REST FOR CLOUD-RESOURCED VIRTUAL MACHINES

BACKGROUND

The performance of many different types of computing devices continues to improve, generation after generation. For example, the processing capability of server computers, desktop computers, laptops, tablets, and smartphones continues to improve, and will likely do so for the foreseeable future. Advances in processing and storage capability allow these types of devices to process and utilize ever larger amounts of data. For example, it is not unusual for some application programs, complex video games for instance, to utilize hundreds of gigabytes ("GB") of program code, audio files, images, text, video, textures, and other types of content.

The various hardware components utilized in many types of computing devices continue to evolve in order to support processing and storage of large amounts of data. For example, the capability of processors, memory devices, mass storage devices, and graphics processing units have evolved quickly, and continue to do so, to support the processing of large amounts of data.

One approach to the improved performance of computing devices is the use of remote computer resources, e.g. the "cloud." For example, processes may be implemented in a remote server or in cloud resources to respond to user control inputs or other data input and the resulting output of the process may be communicated to a user device for display. In other examples, some operations may be implemented in one set of computing resources, such as servers or cloud resources, and other operations may be implemented in other computing resources, such as a client device.

A remote computer resource is often presented as a virtual machine, which is an emulation of a computer system that provides the functionality of a physical computer, but which substitute for a real machine. Virtual machines can provide the functionality of entire operating systems, emulate different software and hardware platforms, and allow platform independent execution of applications and other code.

It is often advantageous to access remote computer resources over the internet to utilize shared pools of computer system resources that can offer high capacity computing or storage on an on-demand basis and which can be maintained by third party cloud service providers. In many cases, however, the extensive utilization of remote computer resources can entail the existence of very large numbers of virtual machines, e.g. cloud resourced virtual machines, each with its own virtual diskset, e.g. the virtual hard drive for a virtual machine, that must be managed. Improvements in efficiency in managing large numbers of virtual machines, therefore, often yield significant benefits to a compute resource provider, e.g. cloud service provider, in terms of resource utilization, availability and overall performance.

It is with respect to these and other technical challenges that the disclosure made herein is presented.

SUMMARY

A compute resource provider system that efficiently encrypts a virtual diskset for a virtual machine is disclosed. The performance of computing devices implementing the disclosed technologies can be improved by reducing the amount of computing resources required to encrypt the virtual disksets for the very large number of virtual machines typically hosted by compute resource provider systems. When fewer computing resources are required for encrypting the virtual disksets, those resources can be utilized by customers of the compute resource provider systems, thereby increasing the availability of compute resources and improving the overall performance of the compute resource provider system. Other technical benefits not specifically mentioned herein can also be realized through implementations of the disclosed subject matter.

In order to realize the technical benefits mentioned briefly above, a compute resource provider system that encrypts a virtual diskset for a virtual machine includes an encryption agent for encrypting the virtual diskset and a host agent for controlling the operation of the virtual machine itself. The encryption agent obtains a cryptographic key for the virtual machine and sends the cryptographic key to the host agent. The host agent receives the cryptographic key from the encryption agent and stores the received cryptographic key in a user key vault. The key vault can be a dedicated key vault for a particular customer, which is available to any host agent that supports the customer.

The host agent generates a key vault secret reference ("KVSR") locator pointing to the cryptographic key stored in the user key vault and associates the KVSR with the virtual diskset, such as by including the KVSR in metadata or a directory object for the virtual machine. Note that the KVSR is a resource locator that specifies the location on a computer network of the cryptographic key so that the cryptographic key can be retrieved by another host agent with access to the user key vault. Once the cryptographic key and the KVSR are established, the host agent sends a success message to the encryption agent. In response to the success message, the encryption agent encrypts the virtual diskset using the cryptographic key.

Subsequently, another host agent that supports the customer, which may be on the same physical platform as the host agent that participated in the encryption process or on a different physical platform, can utilize the KVSR to access the key vault to obtain the cryptographic key for an encrypted VM virtual diskset. Thus, when a host agent receives a restart request for the virtual machine, the host agent will obtain the KVSR associated with the virtual diskset for the virtual machine and, using the KVSR, obtain the cryptographic key from the user key vault.

Using the cryptographic key from the user key vault to decrypt the encrypted virtual diskset, the host agent boots, e.g. initializes the operating system, the virtual machine from the decrypted virtual diskset. For example, in on-the-fly encryption, the encrypted virtual diskset can be decrypted into random access memory space for execution. Thus, the use of a KVSR as described allows a VM virtual diskset to be encrypted once in one platform, but the VM can be booted by another host agent on another platform that can access the user key vault using the KVSR.

The cryptographic key can be provided to the encryption agent from a customer who utilizes the virtual machine. This enables customer entities to manage their own cryptographic credentials if so desired. Alternatively, the encryption agent can generate the cryptographic key within the compute resource provider system, such as by utilizing a hardware cryptographic module or other facilities. In either case, the VM virtual diskset can be encrypted once for a VM and the cryptographic credentials stored in the user's key vault for subsequent access.

The KVSR that references the location in the user key vault for the cryptographic key of the virtual machine can be associated with the virtual machine in multiple ways. For example, the KVSR can be included in metadata or in a directory object corresponding to the virtual diskset. The KVSR can be associated with the virtual machine using a directory service, such as AZURE Active Directory from MICROSOFT CORP.

As discussed briefly above, implementations of the technologies disclosed herein, can more efficiently use the computer resources needed to encrypt virtual disksets for large numbers of virtual machines by encrypting each virtual diskset once and enabling the virtual machine to be subsequently booted by any host agent with access to the user key vault therefore avoiding multiple encryption cycles for a virtual diskset and reducing the utilization of processor cycles, power, and potentially other types of computing resources. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a messaging diagram showing an illustration of message transfer in a cloud compute resource provider system that enables efficient encryption of a virtual machine utilizing a key vault secret reference, according to one embodiment;

DETAILED DESCRIPTION

Figure 1:
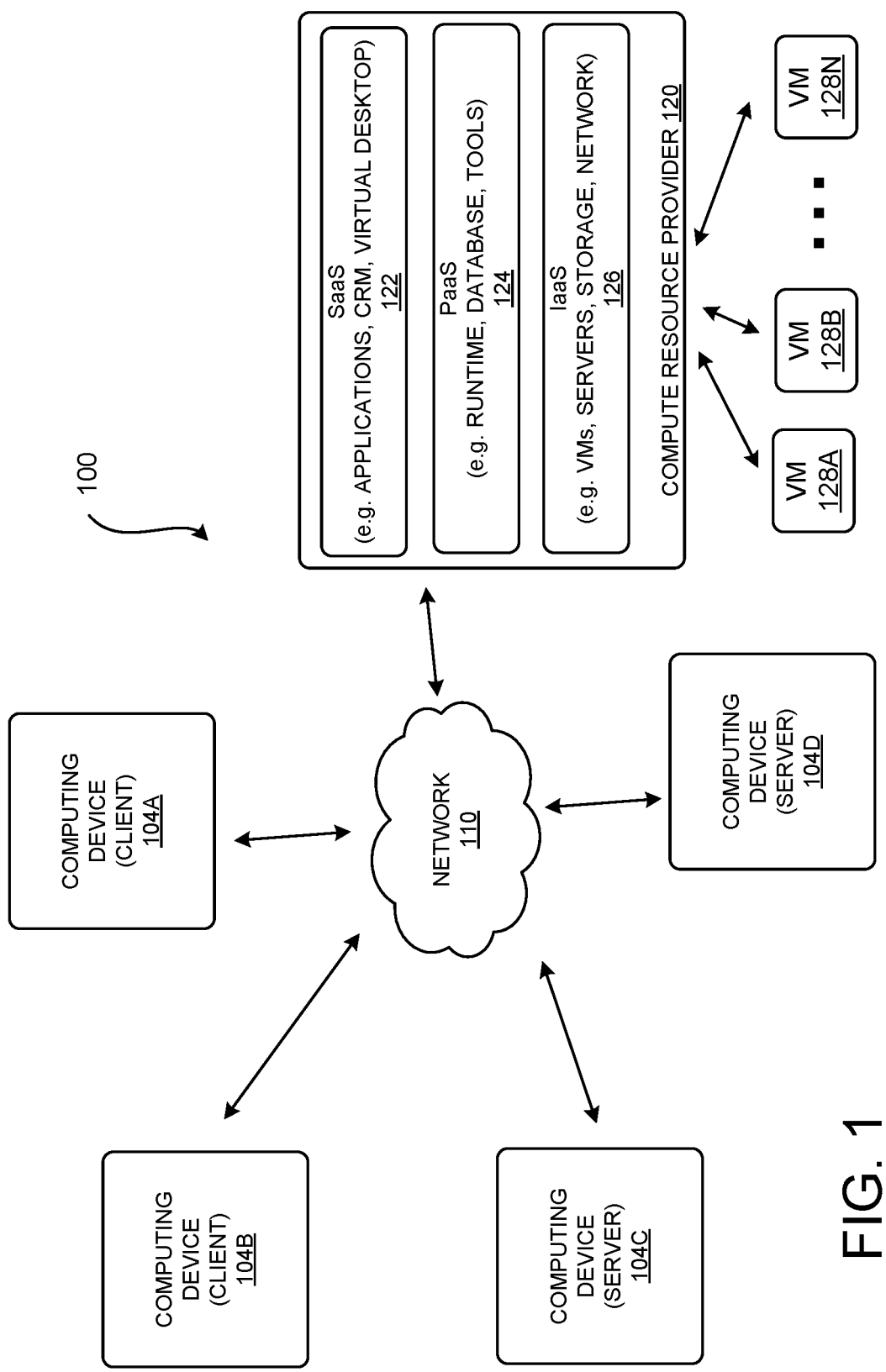
FIG. 1 is a network architecture diagram showing an illustrative computing system involving virtual machines hosted on a cloud computing resource provider system.

The following detailed description is directed to a computer-implemented system for encrypting a virtual diskset for a virtual machine in a cloud computing environment. As discussed briefly above, the extensive utilization of remote computer resources can entail the existence of very large numbers of virtual machines, each with its own virtual diskset, that must be managed. The efficiency of managing and operating large numbers of virtual machines can be improved by the disclosed approach to encrypting virtual disksets in a cloud computing environment utilizing a key vault secret reference that references a location in a key vault for a cryptographic key for each virtual machine. The improved efficiency of the disclosed approach can yield significant benefits to a cloud service provider in terms of resource utilization, availability and overall performance.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of a machine learning system that provides reduced network bandwidth transmission of content will be described.

As noted above, remote computer resources, e.g. the "cloud," are increasingly used to perform computer processing, such as to respond to user control inputs or other data input. In some cloud computing scenarios, some operations may be implemented in one set of computing resources, such as clients and servers, and other operations may be implemented in other computing resources, such as cloud resources provided by one or more compute resource providers.

In a cloud architecture, a remote computer resource often takes the form of a virtual machine, which is an emulation of a computer system that provides the functionality of a physical computer, but which substitutes for a real machine. Virtual machines, for example, can provide the functionality of entire operating systems, emulate different software and hardware platforms, and allow platform independent execution of applications and other code.

FIG. 1 is a network architecture diagram showing an illustrative cloud computing environment 100 involving user or enterprise-controlled computing devices 104 in combination with cloud compute resources provided by computer resource provider system 120. In this example, computing devices 104A and 104B are client devices, such as personal computers, laptop computers, tablet computers, or smart phones, and computing devices 104C and 104D are servers, such as servers operated and maintained by a customer on their own premises. The client devices 104A and 104B, in this example, are in communication with the resources of compute resource provider 120 through network 110.

Note that a cloud computing environment may include many computer resource provider systems 120 offered by different providers. Examples of compute resource providers include the WINDOWS AZURE Service Platform from MICROSOFT CORPORATION, the AMAZON AWS from AMAZON, INC., the GOOGLE Cloud Platform from GOOGLE INC., and platform virtualization software and services from VMWARE, INC.

Cloud compute resources in a cloud computing environment are commonly presented to users or customers in a variety of ways, as illustrated in the example of FIG. 1. One cloud computing approach is a Software-as-a-Service ("SaaS") model 122 wherein the compute resource provider 120 installs and maintains software, such as applications, Customer Relationship Management ("CRM") software, or a virtual user desktop, on the compute resource provider's facilities 120 and users access the software over the network 110.

Another cloud computing model is Platform-as-a-Service ("PaaS") 124 where customers deploy customer-created or acquired application software, such as databases or tools, to the compute resource providers facilities 120 and the provider hosts the customers application on the provider's compute resources, e.g. network, servers, storage, or operating system. Yet another cloud computing model is Infrastructure-as-a-Service ("IaaS") 126 where the customer is provided with a high-level Application Programming Interface ("API") to the physical computing resources of the compute resource provider.

Often, the physical computing resources of the compute resource provider 120 support large numbers of virtual machines ("VMs") 128 that provide the functionality of a physical computer to service the customer's computing needs, but which are emulations of a computer system. In their simplest form, VMs provide the functionality to execute an operating system using shared hardware, e.g. a virtual hard drive for the VM. A VM virtual diskset can also have software installed on it, such as database, application servers or other applications, as well as launch information, such as the permissions that control which accounts can launch the VM and data specifying volumes to be attached to a VM when it is launched. An active compute resource provider system 120 may host thousands of VMs to support their customers' processing needs.

Note that a compute resource provider system 120 can host services for multiple customers on the same facilities.

It is desirable, therefore, to maintain the security of VM virtual disksets, which may be viewed as virtual hard drives for the VMs, to encrypt the VM virtual disksets. Encrypting very large numbers of VM virtual disksets and then managing the encrypted VM virtual disksets during operation of the VMs on the compute resource provider system 120 presents a challenge.

Figure 2:
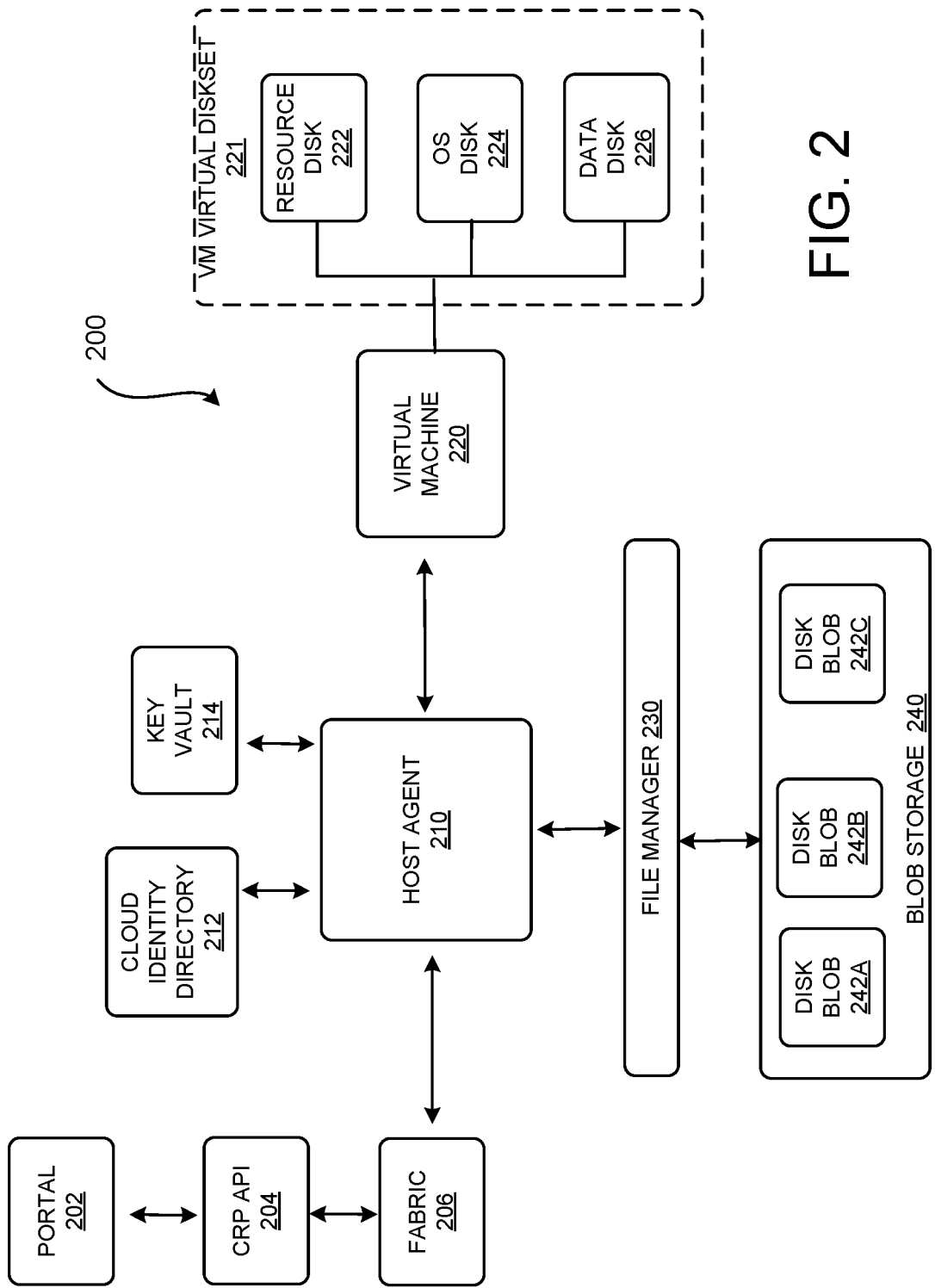
FIG. 2 is a software architecture diagram showing an illustration of a cloud compute resource provider system hosting a virtual machine.

FIG. 2 is a software architecture diagram showing one illustration of a cloud compute resource provider system 200, such as the system 120 of FIG. 1, hosting a virtual machine 220. In system 200, customers access the system from a network through a portal 202 to the compute resource provider's ("CRP") application program interface ("API") 204 and fabric 206. Fabric 206, such as the AZURE Fabric Controller of the WINDOWS AZURE Service Platform from MICROSOFT CORPORATION, manages the provision of hardware resources to a hosted application and the operation of hosted virtual machines.

Fabric 206 utilizes a host agent 210 to manage and operate virtual machine 220. Host agent 210 provisions resources for the VM virtual diskset 221 for VM 220, such as resource disk 222, OS disk 224, and encrypted disk 226, on the compute resource provider's system for operation of the VM 220 and manages the VM, VMs are frequently started when a customer requests usage of a VM, e.g. when a customer user activates an application, and then stopped when the customer ceases use of the VM. Often, the VM virtual diskset 221 is stored on a mass storage device of the cloud compute resource system 200, such as blob storage 240, from which the VM 220 is provisioned for operation by host agent 210 to activate the VM 220.

To provide one example, host agent 210 may receive a start request from a customer, e.g. a user client device or customer server, through portal 202 and CRP API 204 through fabric 206. In this example, the start message includes user credentials or other credentials for accessing an encrypted VM virtual diskset 221 in blob storage 240. Host agent 210 responds to the start request by authenticating the credentials using cloud identity directory 212, such as a WINDOWS AZURE Active Directory from MICROSOFT, obtaining a cryptographic key from key vault 214 using an authorization token from cloud identity directory 212, and using file manager 230 to obtain the corresponding encrypted VM virtual diskset from blob storage 240, which stores multiple disk blobs 242A, 242B and 242C. The host agent 210 allocates resources for resource disk 222, and OS disk 224 and encrypted disk 226 and mounts the obtained VM virtual diskset 221, which host agent 210 accesses using the cryptographic key from key vault 214. The host agent 210 boots from the VM virtual diskset to begin the VM emulation. For example, code from data disk 226, e.g. the VM's virtual hard drive, is decrypted into random access memory space for execution using the cryptographic key.

The large number of VM virtual disksets that may be stored by a computer resource provider means that an efficient approach to encrypting the VM virtual disksets and managing the cryptographic credentials for the VM virtual disksets in a key vault is important to effectively managing the resources of the computer resource provider. Also, efficient encryption may be complicated by customers who wish to provide and manage their own cryptographic credentials. The disclosed technology enables a customer the flexibility to provide their own cryptographic credentials for VMs hosted on a compute resource provider system or have the system create the cryptographic credentials.

Figure 3:
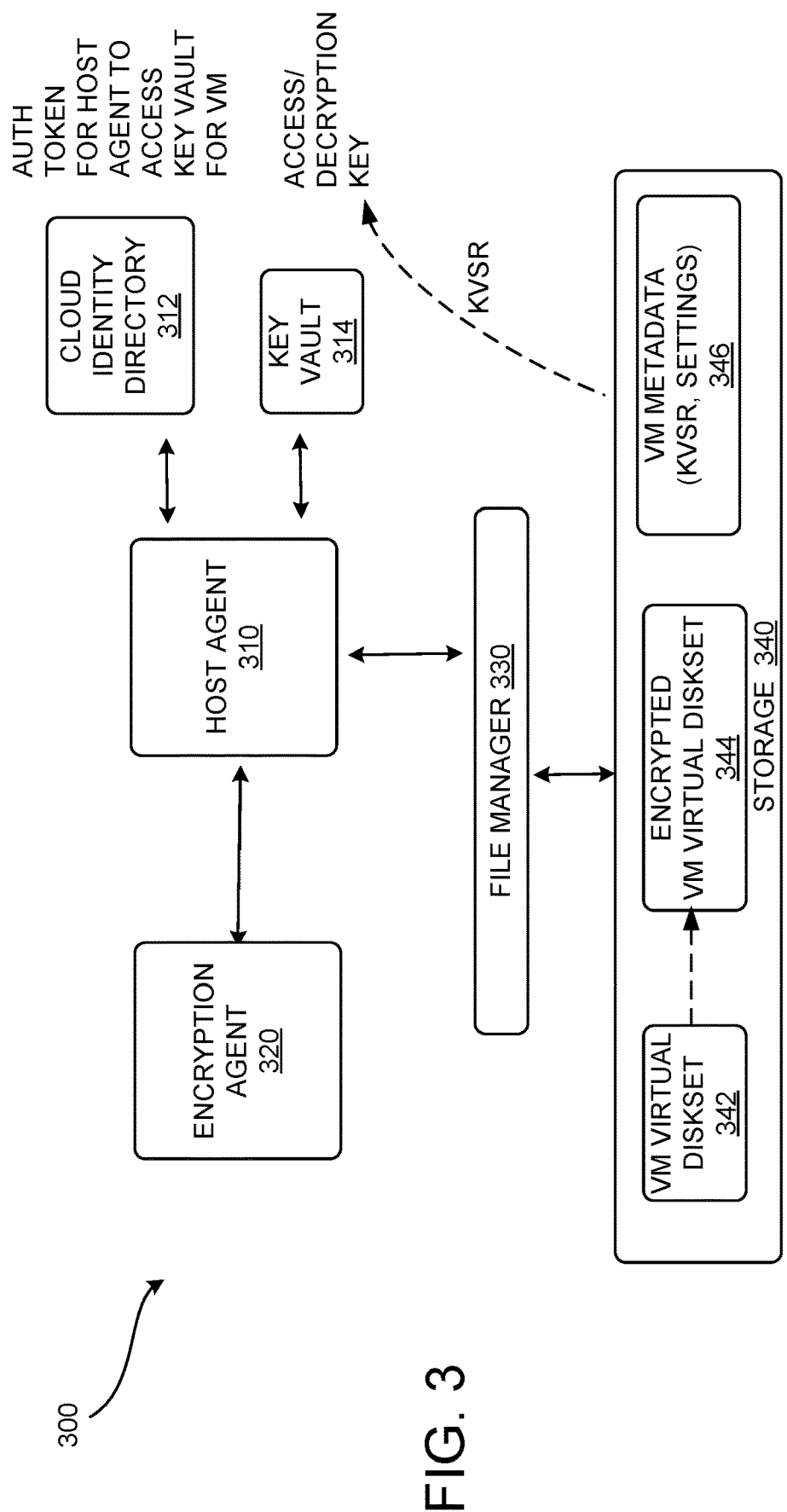
FIG. 3 is a software architecture diagram showing an illustration of a cloud compute resource provider system that enables efficient encryption of a virtual machine utilizing a key vault secret reference, according to one embodiment.

FIG. 3 is a software architecture diagram showing an illustration of a compute resource provider system 300 having a host agent 310 for controlling VMs and an encryption agent 320 that enables efficient encryption of a VM virtual diskset by storing a cryptographic key for the virtual machine in a key vault and creating a key vault secret reference ("KVSR") for the VM that specifies the location in the key vault of the cryptographic key for the virtual machine, according to one embodiment. The system 300 includes an encryption agent 320 that is used to encrypt VM virtual diskset 342 in storage 340 to produce an encrypted VM virtual diskset 344. Encryption agent 320 coordinates with host agent 310 to encrypt the VM virtual diskset 342 and manage the cryptographic credentials for the encrypted VM virtual diskset 344. Host agent 310 accesses the VM virtual diskset 342 or encrypted VM virtual diskset 344 in storage 340 using file manager 330. VM metadata 346 for the VMs is also stored in storage 340.

As noted above, encryption agent 320 obtains a cryptographic key for the virtual machine that and sends the cryptographic key to the host agent 310. The host agent 310 receives the cryptographic key and stores the received cryptographic key in key vault 314. The key vault 314 can be a dedicated key vault for a particular customer and is accessible to any host agent on the compute resource provider system 300 that supports the customer.

FIG. 4 is a messaging diagram showing an illustration of message transfer scenario 400 in the compute resource provider system 300 of FIG. 3 that enables efficient encryption of a virtual machine utilizing a key vault secret reference ("KVSR"), according to one embodiment. In the example of FIG. 4, encryption agent 320 obtains the cryptographic key for the VM virtual diskset 342.

The cryptographic key can be provided to the encryption agent 320 from a customer who utilizes the virtual machine. For example, the encryption agent 320 can receive the cryptographic credentials from the customer through portal 202, CRP API 204 and fabric 206. This enables customer entities to manage their own cryptographic credentials if so desired, such as in a hybrid or private cloud scenario. Alternatively, the encryption agent 320 can generate the cryptographic key within the compute resource provider system 300, such as by utilizing a hardware cryptographic module or other facilities. In either case, the VM virtual diskset 342 can be encrypted once for a VM and the cryptographic key stored in the user's key vault for subsequent access.

At 402, encryption agent 320 sends the cryptographic key for the VM virtual diskset 342 to host agent 310A. At 410, host agent 310A stores the cryptographic key in key vault 314 and the key vault generates a KVSR that references the location of the cryptographic key in key vault 314. The key vault 314 can be a dedicated key vault for a particular customer. The KVSR is a resource locator that provides a path to the location of the cryptographic key in the key vault 314 so that the cryptographic key is accessible to another host agent on the compute resource provider system 300 that supports the customer. At 411, the key vault 314 sends the KVSR to the host agent 310A.

At 412, the host agent 310A associates the KVSR with the VM in VM metadata 346 in storage 340. In some implementations, the KVSR that references the location in the user key vault 314 for the cryptographic key of the virtual machine can be associated with the virtual machine in other ways. For example, the KVSR can be included in a directory object corresponding to the virtual machine virtual diskset. In other implementations, the KVSR can be associated with the virtual machine using a directory service, such as AZURE Active Directory from MICROSOFT CORP.

At 414, host agent 310A sends a success indicator to encryption agent 320. Encryption agent 320 obtains the VM virtual diskset 342 from storage 340 and, upon receiving the success indicator or message, encrypts the VM virtual diskset using the cryptographic key from credentials that were previously received or generated. Once encryption is complete, the encrypted VM virtual diskset 344 is stored in storage 340 and the VM virtual diskset 342 can be destroyed.

Subsequently, another host agent 310B that supports the customer's VMs on the same or another platform that can access the key vault 314 can boot the VM with the encrypted virtual diskset using the KVSR that was stored during the encryption process. This other host agent 310B has substantially the same functionality as host agent 310A as shown in host agent 310 of FIG. 3. When a restart message 420 is received by host agent 310B, the host agent 310B accesses cloud identity directory 312 at 422 to validate the customer identity information for the VM and provide an authorization token at 424 that permits the other host agent to access key vault 314. At 426, host agent 310B accesses VM metadata 346 for the VM to obtain the KVSR that was stored in metadata at 412.

At 430, host agent 310B utilizes the KVSR and the authorization token to access key vault 314 and obtain the cryptographic key stored at the location in key vault 314 referenced by the KVSR. At 434, host agent 310B obtains, at 436, the encrypted VM virtual diskset 344 from storage 340 and, using the cryptographic key obtained from key vault 314 at 432, boots the VM with the encrypted VM virtual diskset, e.g. initializes the operating system for the virtual machine with the encrypted virtual diskset 344. For example, in on-the-fly encryption, the encrypted virtual diskset 344 is decrypted into random access memory space for execution.

Utilizing the disclosed technology, another host agent that supports the customer, which may be on the same physical platform as the host agent 310A that participated in the encryption process or on a different physical platform, can utilize the KVSR to access the key vault 314 to obtain the cryptographic key for the encrypted VM virtual diskset 344. Thus, when another host agent 310B receives a restart request for the virtual machine, that host agent 310B will obtain the KVSR associated with the virtual diskset 344 for the virtual machine from VM metadata for the VM in storage 340 and, using the KVSR, obtain the cryptographic key from the user key vault 314. Thus, the use of a KVSR as described allows a VM virtual diskset to be encrypted once in one platform, but the VM can be booted by another host agent 310B on the same or another platform that can access the user key vault 314 using the KVSR.

Figure 5A:
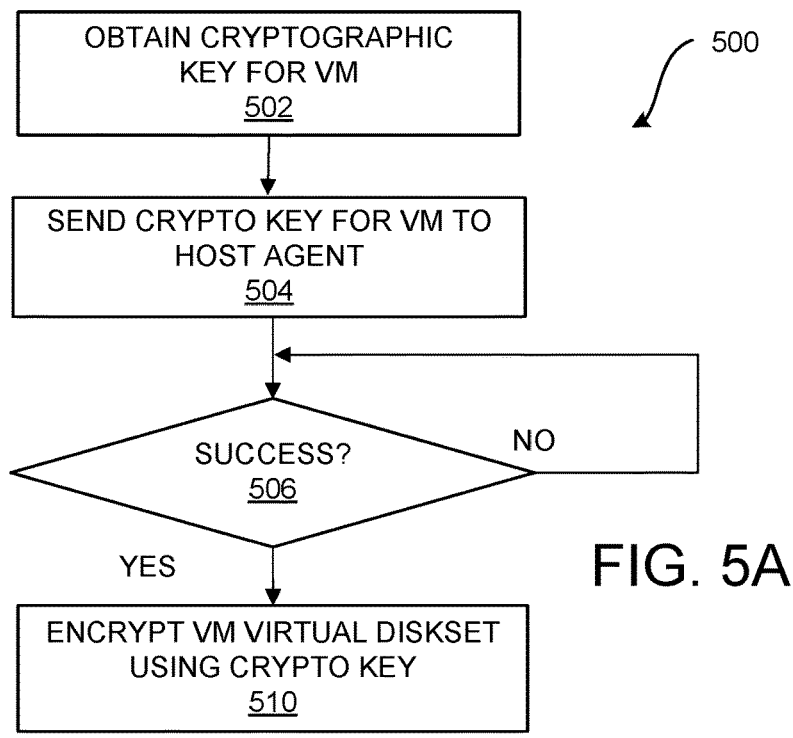
FIG. 5A is a flow diagram showing a routine that illustrates aspects of the operation of an encryption agent in the cloud compute resource provider system illustrated in FIGS. 3 and 4 that enables efficient encryption of a virtual machine utilizing a key vault secret reference, according to one embodiment disclosed herein.
Figure 5B:
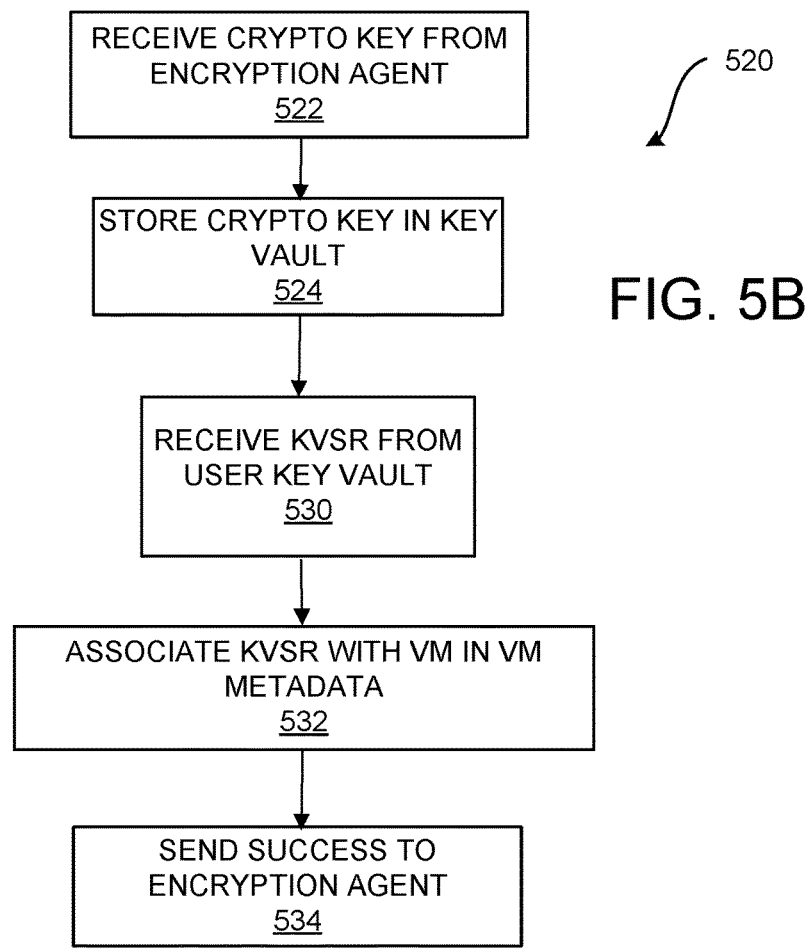
FIG. 5B is a flow diagram showing a routine that illustrates aspects of the operation of a host agent in the cloud compute resource provider system illustrated in FIGS. 3 and 4 that enables efficient encryption of a virtual machine utilizing a key vault secret reference, according to one embodiment disclosed herein.
Figure 5C:
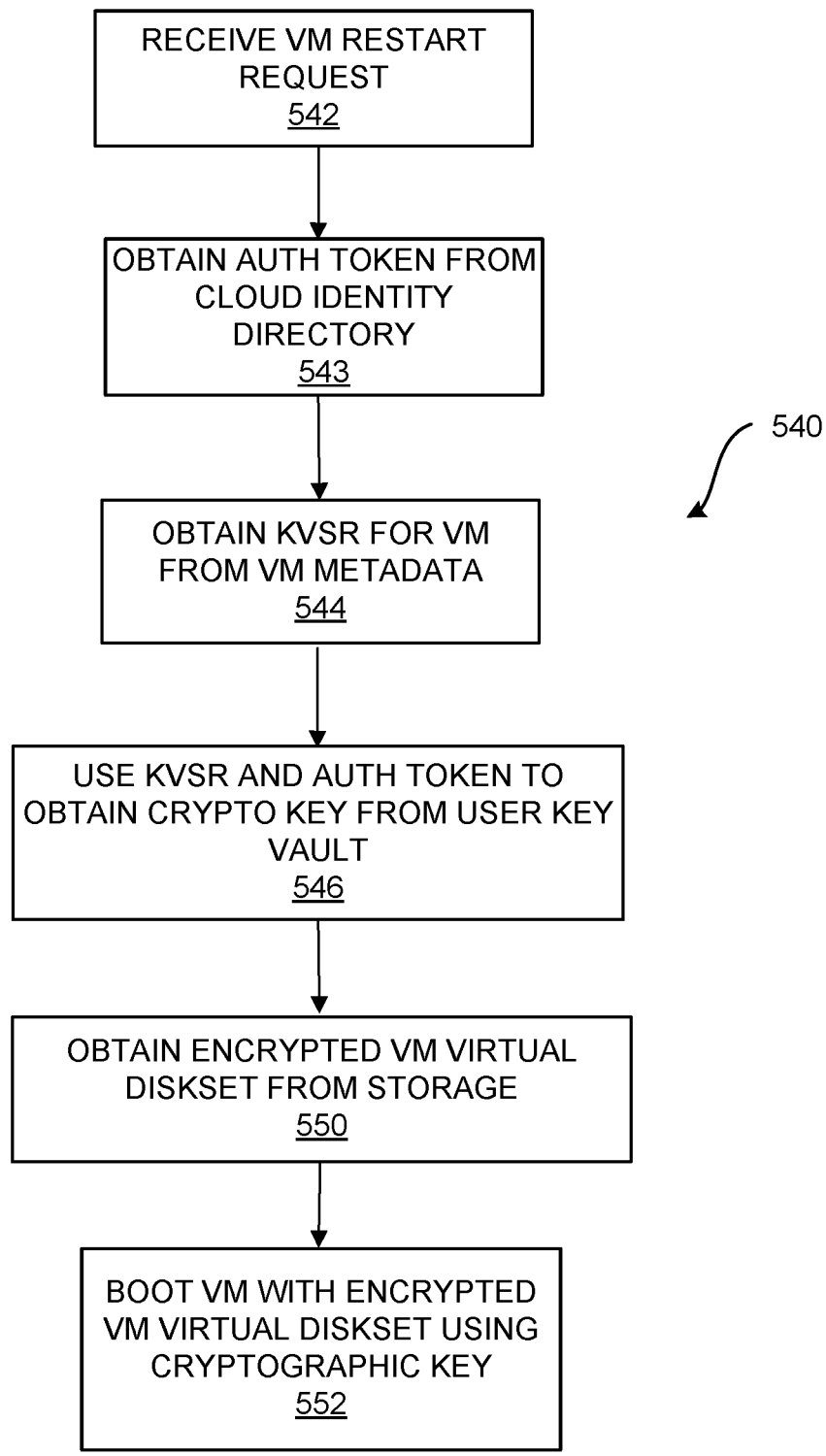
FIG. 5C is a flow diagram showing a routine that illustrates aspects of the operation of another host agent in the cloud compute resource provider system illustrated in FIGS. 3 and 4 that enables booting of an encrypted virtual machine utilizing a key vault secret reference, according to one embodiment disclosed herein.

FIG. 5A is a flow diagram showing a routine 500 that illustrates aspects of the operation of the encryption agent 320 in the compute resource provider system 300 illustrated in FIGS. 3 and 4 that enables efficient encryption of a virtual machine utilizing a KVSR, according to one embodiment disclosed herein. At 502, the encryption agent obtains the cryptographic key or encryption settings for a VM having an unencrypted VM virtual diskset. As noted above, the cryptographic key or encryption settings may be provided by a customer or may be generated within the cloud compute resource system 300. In this example, a symmetric cryptographic key is utilized to encrypt and decrypt a VM virtual diskset. In some implementations, an additional cryptographic layer using a public key pair can be used to protect communications using the symmetric cryptographic key where one key of the pair is an encryption key and the other key is a decryption key. At 504, the cryptographic key is sent to host agent 310A.

At 506, encryption agent 320 waits to receive a success indication from host agent 310A. Once the success indication, which indicates that the key vault 314 is configured with the cryptographic key for the VM, the encryption agent 320 encrypts the VM virtual diskset 342 using the cryptographic key to generate encrypted VM virtual diskset 344, which is stored in storage 340.

5B is a flow diagram showing a routine 520 that illustrates aspects of the operation of a host agent 310A in the compute resource provider system 300 illustrated in FIGS. 3 and 4 that enables efficient encryption of a virtual machine virtual diskset utilizing a key vault secret reference, according to one implementation disclosed herein.

At 522, the host agent 310A receives the cryptographic key from encryption agent 320 and, at 524, stores the cryptographic key in key vault 314. The key vault 314 generates a KVSR that references the location of the cryptographic key in key vault 314, which is received by host agent 310A at 530.

At 532, the host agent associates the KVSR with the VM virtual diskset in metadata for the VM in VM metadata 346 in storage 340. Note that some implementations may store metadata for the VM in locations other than storage 340, but that host agent 310 can still access. Once the KVSR is stored in the VM metadata 346, host agent 310 sends 534 a success indication to encryption agent 320 which proceeds with encryption of the VM virtual diskset 342 to produce encrypted VM virtual diskset 344.

5C is a flow diagram showing a routine 540 that illustrates aspects of the operation of the host agent 310B in the compute resource provider system 300 illustrated in FIGS. 3 and 4 that enables a host agent 310 that supports the customer's VMs on the same or another platform to boot of the VM with encrypted VM virtual diskset 344 utilizing the KVSR, according to one embodiment disclosed herein.

With the VM inactive, the host agent 310B, at 542, receives a restart request for the VM. At 543, host agent 310B obtains an authorization token for the VM from cloud identity directory 312, which allows the host agent 310 access to key vault 314 for the VM. At 544, the host agent 310B obtains the KVSR for the VM from VM metadata 346, and, at 546, utilizes the KVSR and the authorization token to obtain the cryptographic key from the location in key vault 314 referenced by the KVSR. At 550, host agent 310B obtains the encrypted VM virtual diskset 344 from storage 340 and, at 552, boots the VM with the encrypted VM virtual diskset using the cryptographic key obtained from the key vault to decrypt the encrypted VM virtual diskset 344.

It is to be appreciated that while the embodiments disclosed herein have been presented primarily in the context of a key vault and VM metadata stored in storage, the technologies disclosed herein can be similarly applied to other contexts where similar functionality to a customer key vault is utilized or where the KVSR is stored in other metadata or data that associates the KVSR with the VM virtual diskset.

Figure 6:
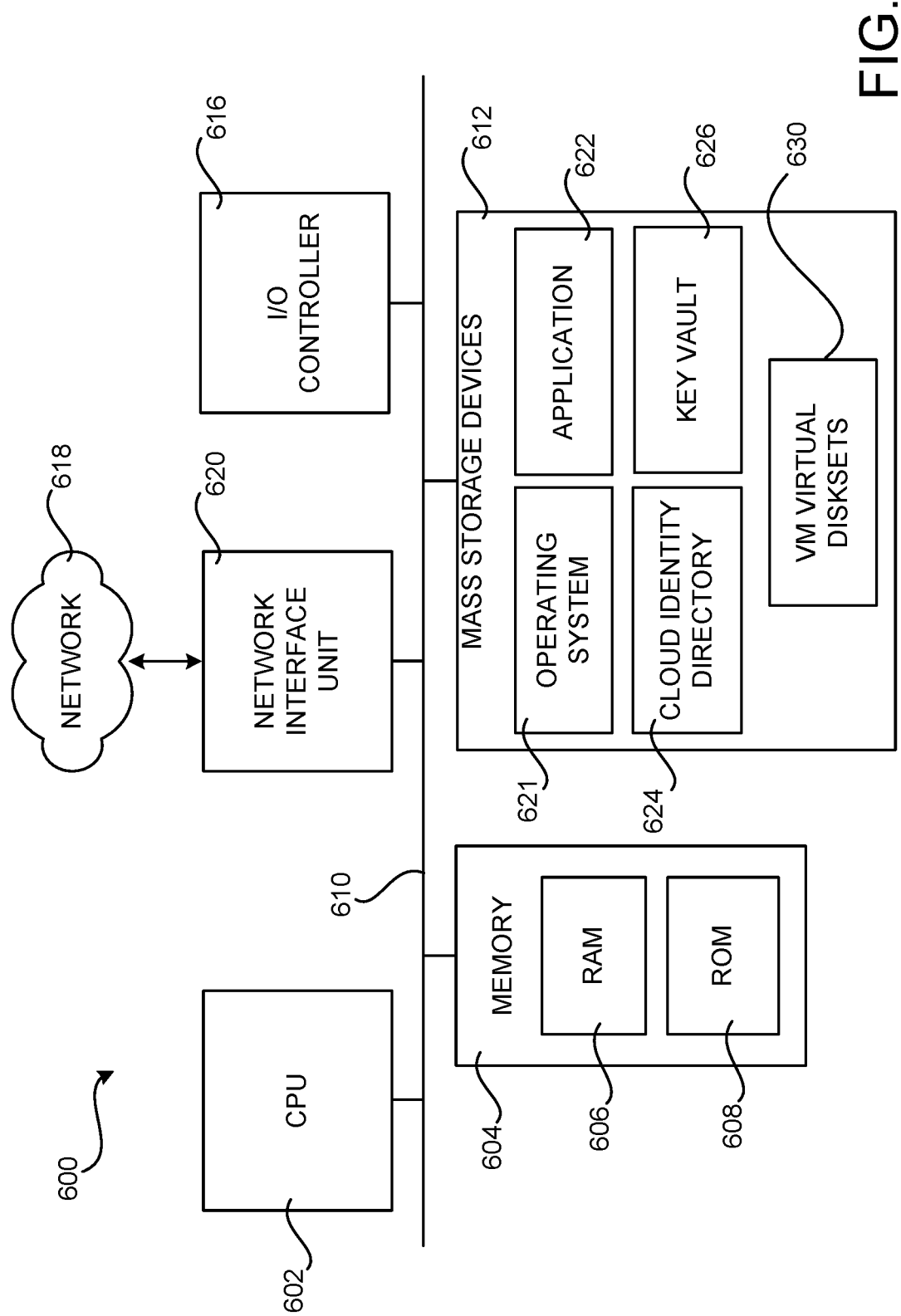
FIG. 6 is a computer architecture diagram showing an illustrative computer hardware and software architecture for a computing device, such as the computing devices shown in FIGS. 1, 2 and 3, that can implement aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement the computing devices 104 or compute resource provider 120 illustrated in FIG. 1 or some or all of the components of the compute resource provider systems 200 and 300 illustrated in FIGS. 2 and 3 and described above, which are capable of executing the various software components described above.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs including, but not limited to, the cloud identity directory 624 and key vault 626. The mass storage devices 612 can also be configured to store the VM virtual disksets 630. The cloud identity directory 624 and key vault 626 can be stored in a different storage device from one another and the VM virtual disksets 630.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, such as the encryption agent 320 and host agent 310, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
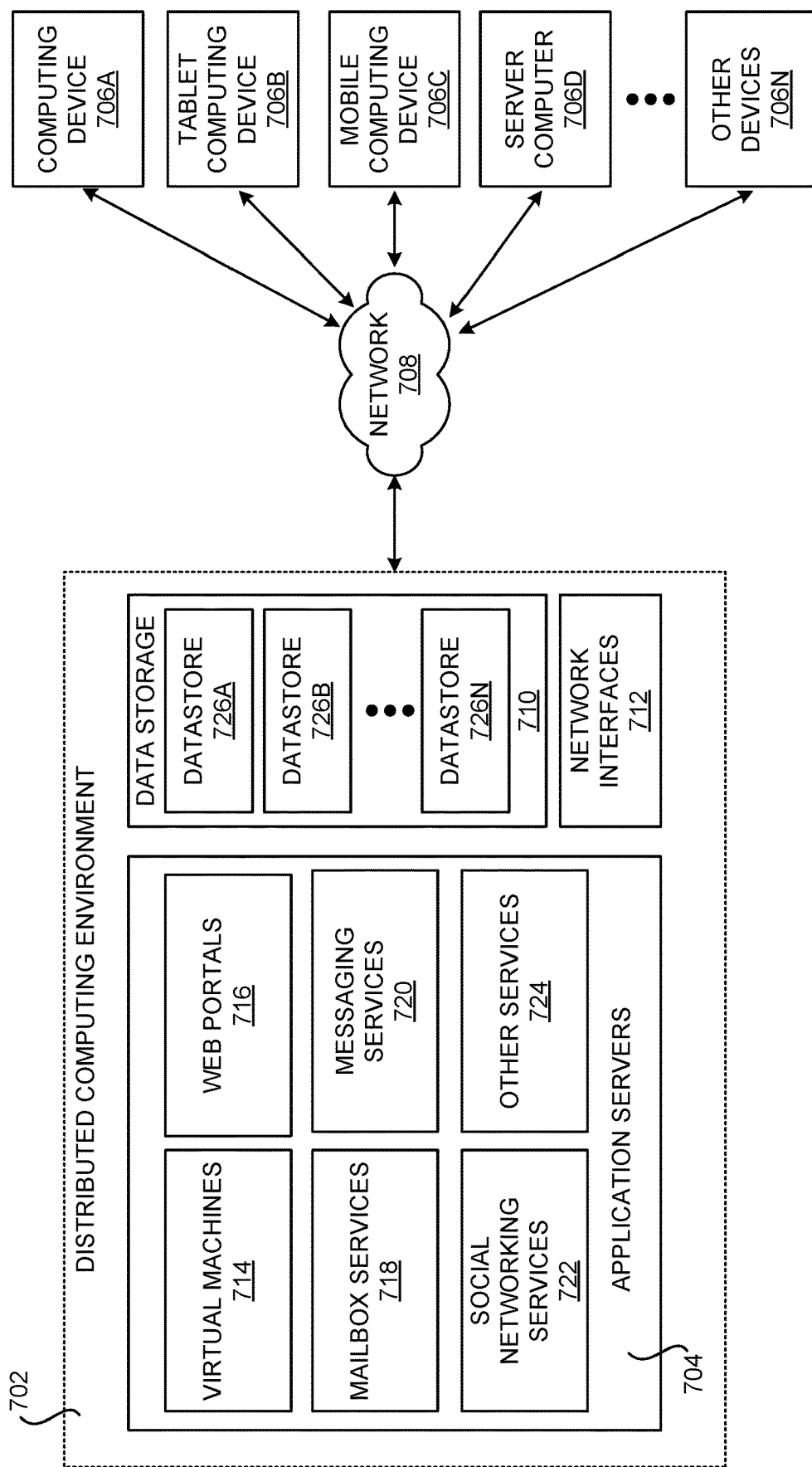
FIG. 7 is a network diagram illustrating a distributed computing environment capable of implementing aspects of the technologies presented herein.

FIG. 7 shows aspects of an illustrative distributed computing environment 702 that can provide cloud sourced resources, such as the resources provided by one or more compute resource provider systems, in which the software components described herein can be executed. Thus, the distributed computing environment 702 illustrated in FIG. 7 can be used to execute program code capable of providing the functionality described above with respect to FIGS. 1-5 and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative, and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
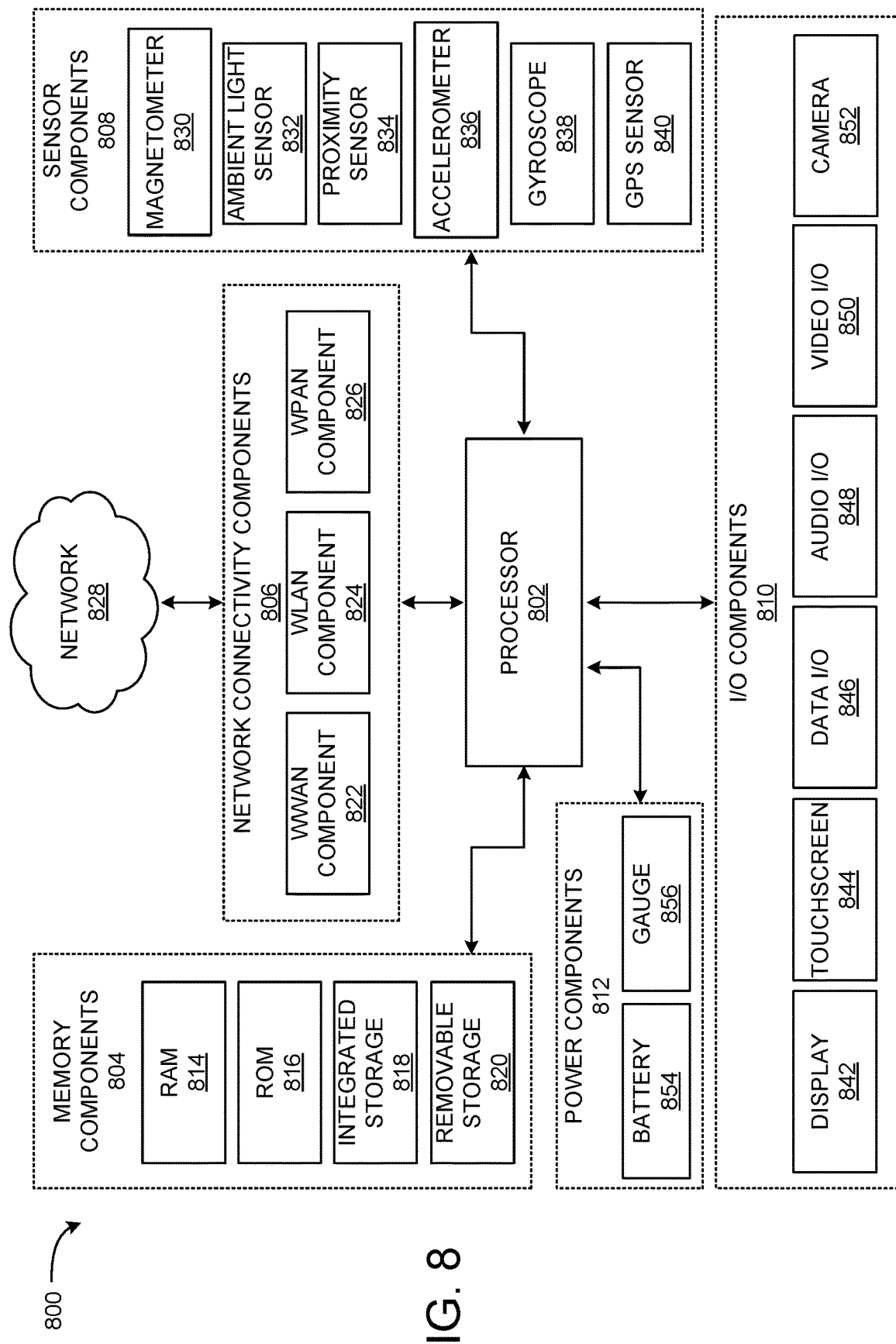
FIG. 8 is a computer architecture diagram illustrating a computing device architecture for a computing device, such as the computing devices shown in FIGS. 1, 2 and 3, that is capable of implementing aspects of the technologies presented herein.

Turning now to FIG. 8, an illustrative computing device architecture 800 will be described for a computing device, such as the computing devices 104 or compute resource provider 120 illustrated in FIG. 1 or some or all of the components of the compute resource provider systems 200 and 300 illustrated in FIGS. 2 and 3, that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 800 can also be utilized to implement the computing devices 104 or compute resource provider 120 illustrated in FIG. 1 or some or all of the components of the compute resource provider systems 200 and 300 illustrated in FIGS. 2 and 3 and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined.

The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

The disclosure presented herein also encompasses the subject matter set forth in the following clauses:

Clause 1. A compute resource provider system that encrypts a virtual diskset for a virtual machine, the compute resource provider system comprising: one or more processors; and at least one computer storage medium having computer executable instructions stored thereon which, when executed by the one or more processors, cause the one or more processors to in an encryption agent, obtain a cryptographic key for the virtual machine and send the cryptographic key to a first host agent; in the first host agent, receive the cryptographic key from the encryption agent, store the received cryptographic key to a user key vault, receive from the user key vault a key vault secret reference (KVSR) locator pointing to the cryptographic key stored in the user key vault, associate the KVSR with the virtual diskset, send a success message to the encryption agent; and in the encryption agent, receive the success message from the first host agent and, responsive thereto, encrypt the virtual diskset using the cryptographic key.

Clause 2. The compute resource provider system of Clause 1, wherein the at least one computer storage medium stores further computer executable instructions to in a second host agent, receive a restart request for the virtual machine, responsive to the restart request for the virtual machine, obtain the KVSR associated with the virtual diskset for the virtual machine, using the KVSR, obtain the cryptographic key from the user key vault, and boot the virtual machine with the encrypted virtual diskset using the cryptographic key from the user key vault.

Clause 3. The compute resource provider system of Clause 1, wherein the at least one computer storage medium stores further computer executable instructions to cause the encryption agent to obtain a cryptographic key for the virtual machine by receiving the cryptographic key from a customer.

Clause 4. The compute resource provider system of Clause 1, wherein the at least one computer storage medium stores further computer executable instructions to cause the encryption agent to obtain a cryptographic key for the virtual machine by generating the cryptographic key.

Clause 5. The compute resource provider system of Clause 1, wherein the at least one computer storage medium stores further computer executable instructions to cause the host agent to associate the KVSR with the virtual diskset by including the KVSR in metadata corresponding to the virtual diskset.

Clause 6. The compute resource provider system of Clause 1, wherein the at least one computer storage medium stores further computer executable instructions to cause the host agent to associate the KVSR with the virtual diskset by including the KVSR in a directory object corresponding to the virtual diskset.

Clause 7. The compute resource provider system of Clause 1, wherein the at least one computer storage medium stores further computer executable instructions to cause the host agent to associate the KVSR with the virtual diskset using a cloud identity directory.

Clause 8. A computer storage medium having computer executable instructions stored thereon which, when executed by one or more processors, cause the processors to execute a method for encrypting a virtual diskset for a virtual machine in a cloud computing environment, the method comprising in an encryption agent, obtain a cryptographic key for the virtual machine and send the cryptographic key to a first host agent; in the first host agent, receive the cryptographic key from the encryption agent, store the received cryptographic key to a user key vault, receive from the user key vault a key vault secret reference (KVSR) locator pointing to the cryptographic key stored in the user key vault, associate the KVSR with the virtual diskset, send a success message to the encryption agent; and in the encryption agent, receive the success message from the first host agent and, responsive thereto, encrypt the virtual diskset using the cryptographic key.

Clause 9. The computer storage medium of Clause 8, wherein the at least one computer storage medium stores further computer executable instructions to in a second host agent, receive a restart request for the virtual machine, responsive to the restart request for the virtual machine, obtain the KVSR associated with the virtual diskset for the virtual machine, using the KVSR, obtain the cryptographic key from the user key vault, and boot the virtual machine with the encrypted virtual diskset using the cryptographic key from the user key vault.

Clause 10. The computer storage medium of Clause 8, wherein the at least one computer storage medium stores further computer executable instructions to cause the encryption agent to obtain a cryptographic key for the virtual machine by receiving the cryptographic key from a customer.

Clause 11. The computer storage medium of Clause 8, wherein the at least one computer storage medium stores further computer executable instructions to cause the encryption agent to obtain a cryptographic key for the virtual machine by generating the cryptographic key.

Clause 12. The computer storage medium of Clause 8, wherein the at least one computer storage medium stores further computer executable instructions to cause the host agent to associate the KVSR with the virtual diskset by including the KVSR in metadata corresponding to the virtual diskset.

Clause 13. The computer storage medium of Clause 8, wherein the at least one computer storage medium stores further computer executable instructions to cause the host agent to associate the KVSR with the virtual diskset by including the KVSR in a directory object corresponding to the virtual diskset.

Clause 14. The computer storage medium of Clause 8, wherein the at least one computer storage medium stores further computer executable instructions to cause the host agent to associate the KVSR with the virtual diskset using a cloud identity directory.

Clause 15. A computer-implemented method for encrypting a virtual diskset for a virtual machine in a cloud computing environment, comprising: in an encryption agent, obtaining a cryptographic key for the virtual machine and sending the cryptographic key to a first host agent; in the first host agent, receiving the cryptographic key from the encryption agent, storing the received cryptographic key to a user key vault, receiving from the user key vault a key vault secret reference (KVSR) locator pointing to the cryptographic key stored in the user key vault, associating the KVSR with the virtual diskset, sending a success message to the encryption agent, and in the encryption agent, receiving the success message from the first host agent and, responsive thereto, encrypting the virtual diskset using the cryptographic key.

Clause 16. The computer-implemented method of Clause 15, the method comprising: in a second host agent, receiving a restart request for the virtual machine, responsive to the restart request for the virtual machine, obtaining the KVSR associated with the virtual diskset for the virtual machine, using the KVSR, obtaining the cryptographic key from the user key vault, and booting the virtual machine with the encrypted virtual diskset using the cryptographic key from the user key vault.

Clause 17. The computer-implemented method of Clause 15, wherein the obtaining a cryptographic key for the virtual machine comprises receiving the cryptographic key from a customer.

Clause 18. The computer-implemented method of Clause 15, wherein the obtaining cryptographic key for the virtual machine comprises generating the cryptographic key.

Clause 19. The computer-implemented method of Clause 15, wherein the associating the KVSR with the virtual diskset comprises including the KVSR in metadata corresponding to the virtual diskset.

Clause 20. The computer-implemented method of Clause 15, wherein the associating the KVSR with the virtual diskset comprises including the KVSR in a directory object in a cloud identity directory, the directory object corresponding to the virtual diskset.

Based on the foregoing, it should be appreciated that a compute resource provider system has been disclosed that efficiently encrypts the virtual disksets for virtual machines. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A compute resource provider system that encrypts a virtual diskset for a virtual machine, the compute resource provider system comprising:
   one or more processors; and
   at least one computer storage medium having computer executable instructions stored thereon which, when executed by the one or more processors, cause the one or more processors to in an encryption agent, obtain a cryptographic key for the virtual machine and send the cryptographic key to a first host agent;
   in the first host agent,
   receive the cryptographic key from the encryption agent,
   store the received cryptographic key to a user key vault,
   receive from the user key vault a key vault secret reference (KVSR) locator pointing to the cryptographic key stored in the user key vault,
   associate the KVSR with the virtual diskset, and
   send a success message to the encryption agent, wherein the success message is sent in response to receiving the cryptographic key from the encryption agent and in response to storing the received cryptographic key to the user key vault; and
   in the encryption agent, receive the success message from the first host agent and, responsive thereto, encrypt the virtual diskset using the cryptographic key.

2. The compute resource provider system of claim 1, wherein the at least one computer storage medium stores further computer executable instructions to
   in a second host agent,
   receive a restart request for the virtual machine,
   responsive to the restart request for the virtual machine, obtain the KVSR associated with the virtual diskset for the virtual machine,
   using the KVSR, obtain the cryptographic key from the user key vault, and
   boot the virtual machine with the encrypted virtual diskset using the cryptographic key from the user key vault.

3. The compute resource provider system of claim 1, wherein the at least one computer storage medium stores further computer executable instructions to cause the encryption agent to obtain a cryptographic key for the virtual machine by receiving the cryptographic key from a customer.

4. The compute resource provider system of claim 1, wherein the at least one computer storage medium stores further computer executable instructions to cause the encryption agent to obtain a cryptographic key for the virtual machine by generating the cryptographic key.

5. The compute resource provider system of claim 1, wherein the at least one computer storage medium stores further computer executable instructions to cause the host agent to associate the KVSR with the virtual diskset by including the KVSR in metadata corresponding to the virtual diskset.

6. The compute resource provider system of claim 1, wherein the at least one computer storage medium stores further computer executable instructions to cause the host agent to associate the KVSR with the virtual diskset by including the KVSR in a directory object corresponding to the virtual diskset.

7. The compute resource provider system of claim 1, wherein the at least one computer storage medium stores further computer executable instructions to cause the host agent to associate the KVSR with the virtual diskset using a cloud identity directory.

8. The compute resource provider system of claim 1, wherein the send the success message to the encryption agent is further caused by the receiving the cryptographic key from the encryption agent, the storing the received cryptographic key to the user key vault, the receiving from the user key vault the key vault secret reference (KVSR) KVSR locator pointing to the cryptographic key stored in the user key vault and the associating the KVSR with the virtual diskset.

9. A computer storage medium having computer executable instructions stored thereon which, when executed by one or more processors, cause the processors to execute a method for encrypting a virtual diskset for a virtual machine in a cloud computing environment, the method comprising:
   in an encryption agent, obtain a cryptographic key for the virtual machine and send the cryptographic key to a first host agent;
   in the first host agent,
     receive the cryptographic key from the encryption agent,
     store the received cryptographic key to a user key vault,
     receive from the user key vault a key vault secret reference (KVSR) locator pointing to the cryptographic key stored in the user key vault,
     associate the KVSR with the virtual diskset, and
     send a success message to the encryption agent, wherein the success message is sent in response to storing the received cryptographic key to the user key vault and in response to receiving from the user key vault the KVSR locator pointing to the cryptographic key stored in the user key vault, and
   in the encryption agent, receive the success message from the first host agent and, responsive thereto, encrypt the virtual diskset using the cryptographic key.

10. The computer storage medium of claim 9, wherein the computer storage medium stores further computer executable instructions to
   in a second host agent,
     receive a restart request for the virtual machine,
     responsive to the restart request for the virtual machine, obtain the KVSR associated with the virtual diskset for the virtual machine,
     using the KVSR, obtain the cryptographic key from the user key vault, and
     boot the virtual machine with the encrypted virtual diskset using the cryptographic key from the user key vault.

11. The computer storage medium of claim 9, wherein the computer storage medium stores further computer executable instructions to cause the encryption agent to obtain a cryptographic key for the virtual machine by receiving the cryptographic key from a customer.

12. The computer storage medium of claim 9, wherein the computer storage medium stores further computer executable instructions to cause the encryption agent to obtain a cryptographic key for the virtual machine by generating the cryptographic key.

13. The computer storage medium of claim 9, wherein the computer storage medium stores further computer executable instructions to cause the host agent to associate the KVSR with the virtual diskset by including the KVSR in metadata corresponding to the virtual diskset.

14. The computer storage medium of claim 9, wherein the computer storage medium stores further computer executable instructions to cause the host agent to associate the KVSR with the virtual diskset by including the KVSR in a directory object corresponding to the virtual diskset.

15. A computer-implemented method for encrypting a virtual diskset for a virtual machine in a cloud computing environment, comprising:
   in an encryption agent, obtaining a cryptographic key for the virtual machine and sending the cryptographic key to a first host agent;
   in the first host agent,
     receiving the cryptographic key from the encryption agent,
     storing the received cryptographic key to a user key vault,
     receiving from the user key vault a key vault secret reference (KVSR) locator pointing to the cryptographic key stored in the user key vault,
     associating the KVSR with the virtual diskset, and
     sending a success message to the encryption agent, wherein the success message is sent in response to receiving from the user key vault the KVSR locator pointing to the cryptographic key stored in the user key vault and in response to associating the KVSR with the virtual diskset, and
   in the encryption agent, receiving the success message from the first host agent and, responsive thereto, encrypting the virtual diskset using the cryptographic key.

16. The computer-implemented method of claim 15, the method comprising:
   in a second host agent,
     receiving a restart request for the virtual machine,
     responsive to the restart request for the virtual machine, obtaining the KVSR associated with the virtual diskset for the virtual machine,
     using the KVSR, obtaining the cryptographic key from the user key vault, and
     booting the virtual machine with the encrypted virtual diskset using the cryptographic key from the user key vault.

17. The computer-implemented method of claim 15, wherein the obtaining a cryptographic key for the virtual machine comprises receiving the cryptographic key from a customer.

18. The computer-implemented method of claim 15, wherein the obtaining cryptographic key for the virtual machine comprises generating the cryptographic key.

19. The computer-implemented method of claim 15, wherein the associating the KVSR with the virtual diskset comprises including the KVSR in metadata corresponding to the virtual diskset.

20. The computer-implemented method of claim 15, wherein the associating the KVSR with the virtual diskset comprises including the KVSR in a directory object in a cloud identity directory, the directory object corresponding to the virtual diskset.

\* \* \* \* \*